United States Patent
Clemes et al.

(10) Patent No.: US 7,045,182 B2
(45) Date of Patent: May 16, 2006

(54) SULPHUR DIOXIDE GENERATORS

(75) Inventors: Dennis Charles Clemes, Constantia (ZA); Petrus Johannes Van Der Westhuyzen, Bellville (ZA); Pieter Johannes Van Der Merwe, Sonnendal (ZA)

(73) Assignee: Grapetek (Proprietary) Limited (ZA)

( * ) Notice: Subject to any disclaimer, the term of this patent is extended or adjusted under 35 U.S.C. 154(b) by 388 days.

(21) Appl. No.: 09/848,255

(22) Filed: May 4, 2001

(65) Prior Publication Data

US 2002/0041939 A1 Apr. 11, 2002

(30) Foreign Application Priority Data

Oct. 10, 2000 (ZA) .......................... 2000/5535

(51) Int. Cl.
*B32B 1/06* (2006.01)
*B65D 65/38* (2006.01)
*A32B 7/152* (2006.01)
*A23L 3/3445* (2006.01)
*B01J 7/00* (2006.01)

(52) U.S. Cl. .................. 428/34.1; 428/34.2; 428/34.4; 428/35.2; 428/35.7; 206/0.6; 206/0.7; 426/127; 426/323; 99/467; 99/485; 422/305; 422/40; 424/405; 424/409; 424/410; 424/411; 424/414; 424/416

(58) Field of Classification Search ............ 428/34.4, 428/34.2, 34.1, 35.7, 35.2; 206/0.6, 0.7; 426/127, 426/323; 99/467, 485; 422/305, 40; 424/405, 424/409, 410, 411, 414, 416
See application file for complete search history.

(56) References Cited

U.S. PATENT DOCUMENTS

| 4,041,209 | A | * | 8/1977 | Scholle ..................... 426/127 |
| 4,487,791 | A | | 12/1984 | Komatsu et al. |
| 4,748,904 | A | * | 6/1988 | Razeto et al. ............... 206/0.6 |
| 5,106,596 | A | * | 4/1992 | Clemes ..................... 422/305 |
| 5,711,211 | A | * | 1/1998 | Ide et al. ..................... 99/467 |
| 6,033,705 | A | * | 3/2000 | Isaacs ....................... 426/323 |
| 6,046,243 | A | * | 4/2000 | Wellinghoff et al. ...... 514/772.3 |

FOREIGN PATENT DOCUMENTS

| EP | 0 292 948 B1 | 11/1988 |
| EP | 0 571 228 A2 | 11/1993 |

* cited by examiner

*Primary Examiner*—Harold Pyon
*Assistant Examiner*—Chris Bruenjes
(74) *Attorney, Agent, or Firm*—Connolly Bove Lodge & Hutz LLP; Larry J. Hume

(57) ABSTRACT

A sulphur dioxide generator (10) is disclosed which comprises two composite sheets (12, 14). First stage release of sulphur dioxide is from a coating (26) of the composite sheet (14). The coating (26) is between a paper sheet (22) and a weldable coating (24). The coating (26) incorporates a substance which, in the presence of moisture, generates sulphur dioxide. Second stage release is from sulphur dioxide generating powder which is in pockets (30). The composite sheet (12) comprises a paper layer (16) and a weldable layer (18). The layers (24, 18) are sealed together along a series of longitudinal and transverse lines to form the pockets (30).

5 Claims, 1 Drawing Sheet

SULPHUR DIOXIDE GENERATORS

FIELD OF THE INVENTION

THIS INVENTION relates to sulphur dioxide generators.

BACKGROUND TO THE INVENTION

Sulphur dioxide generators are placed in cartons containing table grapes, the gaseous sulphur dioxide in the carton preventing the growth on the grapes of certain forms of fungi. Where the grapes are to be shipped over long distances it is conventional to use two stage generators. These generate sulphur dioxide relatively rapidly when first placed in the carton. The fast rate of release lasts for a few days and thereafter sulphur dioxide is released at a much slower rate over a period of several weeks.

Various forms of two stage generator are available commercially. The following four types are known to Applicant:

Type 1. This generator is in two parts. The first part consists of a sheet of a material such as Kraft paper which is pervious to water vapour and sulphur dioxide gas. One face of the sheet has thereon a coating comprising a binder which has dispersed therein a substance, or mixture of substances, which generates sulphur dioxide in the presence of water. The second part comprises two sheets of Kraft paper secured together along a pattern of intersecting lines. The lines and the sheets bound a plurality of pockets. Each pocket has therein, in powder form, the substance(s) which when exposed to water vapour generates sulphur dioxide. The sheets are pervious to both water vapour and sulphur dioxide gas. One first part and one second part are placed in each carton.

Type 2. This comprises three sheets of material. One sheet is of paper, such as Kraft paper, and the other two are of what is called poly coated paper. The coating is of polyethylene. The paper sheet is one of the outside sheets. The sequence of layers is paper, polycoating, paper, polycoating, paper. All three sheets are secured together along a pattern of intersecting lines by heat sealing them together. This forms a series of pockets on each side of the centre polycoated paper sheet, each pocket being bounded by said lines and by two of the sheets. All the pockets contain sulphur dioxide generating substance(s). The paper sheet is more readily penetrated by water vapour than the poly coated sheets. Hence moisture reaches the pockets between the paper sheet and the polycoating of one poly coated sheet before it reaches the pockets between the two poly coated sheets.

Type 3. This generator also comprises three sheets of material, two of them being poly coated and secured together along lines which bound a series of pockets with sulphur dioxide generating substances therein. To this extent the type 3 generator is similar to type 2. However, the third sheet, which is a paper sheet, is laminated to the face of one of the poly coated sheets by a laminating adhesive which has sulphur dioxide generating substance dispersed in it. Water vapour penetrates the paper sheet and reaches the laminating adhesive, and the generating substance dispersed in the laminating adhesive, before it penetrates the poly coated sheets and reaches the pockets between the poly coated sheets.

Type 4. This generator comprises two thin plastic films laminated together using a wax which has sulphur dioxide generating material dispersed therein. The outer face of one of the films carries a coating of sulphur dioxide generating material. The coating is covered by a sheet of non-woven material. The coating provides first stage generation and the generating material between the films provides second stage generation.

The present invention seeks to provide an improved form of two stage sulphur dioxide generator.

BRIEF DESCRIPTION OF THE INVENTION

According to the present invention there is provided a sulphur dioxide generator comprising a first composite sheet comprising a paper substrate with a coating of weldable synthetic plastics material on one face thereof, a second composite sheet comprising a paper substrate with a first coating of a substance which, in the presence of moisture, generates sulphur dioxide and a second coating of a weldable synthetic plastics material thereon, the first coating being between the paper substrate and the second coating, the weldable coatings being secured to one another in such manner as to provide a series of closed pockets between the composite sheets, each pocket having a substance therein which, in the presence of moisture, generates sulphur dioxide, this substance being in powder form.

BRIEF DESCRIPTION OF THE DRAWINGS

For a better understanding of the present invention, and to show how the same may be carried into effect, reference will now be made, by way of example, to the accompanying drawing in which.

DETAILED DESCRIPTION OF THE DRAWINGS

Figure 1:
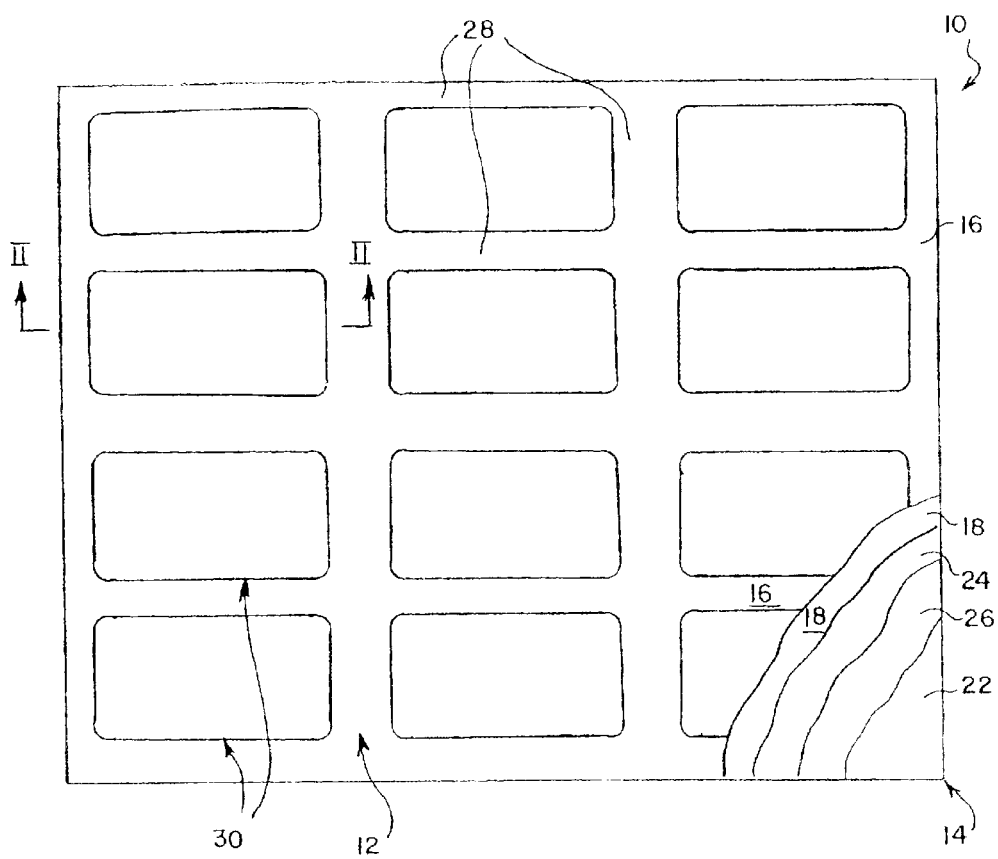
FIG. 1 is a top plan view of a two stage sulphur dioxide generator in accordance with the present invention, layers of the generator being broken away to show the construction.
Figure 2:
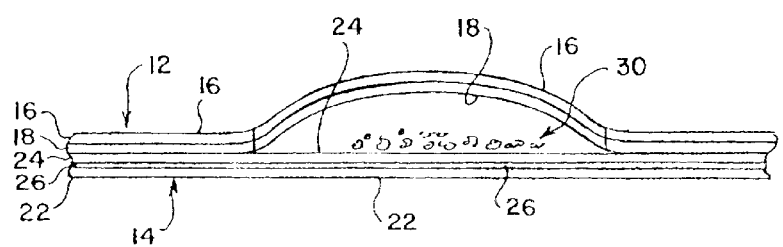
FIG. 2 is a diagrammatic section on the line II—II of FIG. 1, FIG. 2 being drawn to an exaggerated scale.

The two stage generator 10 illustrated in the drawings comprises a composite top sheet 12 and a composite bottom sheet 14. The top sheet consists of a paper sheet 16 which has a polyethylene coating 18 on the under surface thereof.

The composite bottom sheet 14 comprises a paper sheet 22 which has two coatings on the top face thereof, the top coating being designated 24 and being of polyethylene and the coating 26 which is between the sheet 22 and the coating 24 being of a substance which, in the presence of moisture, generates sulphur dioxide. The substance can be sodium metabisulphate, an acidic mixture comprising sodium sulphite and fumaric acid, an acidic mixture comprising sodium sulphite and potassium bitartrate or a mixture of both these acidic mixtures. Coating can be carried out using conventional coating apparatus, the coating 26 being applied before the coating 24.

The composite top sheet 12 and the composite bottom sheet 14 are welded to one another along a series of longitudinal and transverse lines 28. This is achieved by feeding the composite top sheet 12 and the composite bottom sheet 14 between two heated rollers one of which has a pattern of axially extending bars and circumferentially extending rings.

Before the composite top sheet 12 is fed onto the composite bottom sheet 14 and the sheets are heat sealed together, a small amount of gas generating substance, in powder form, is fed onto the bottom composite sheet. The places where the powder lies are not welded together and thus, once the sheets are joined, the powder is in the pockets designated 30 each of which is bounded by four of the lines 28 and by the composite top and bottom sheets 12 and 14.

Water vapour penetrates the sheet 22 and reacts with the coating 26 to provide the fast, initial release. Thereafter the water vapour penetrates the coatings 18 and 24 to reach the powder in the pockets 30.

What is claimed is:

1. A sulphur dioxide generator, comprising:

a first composite sheet comprising a paper substrate with a coating of weldable synthetic plastics material on one face thereof, a second composite sheet comprising a paper substrate with a first coating of a substance which, in the presence of moisture, generates sulphur dioxide, and a second coating of a weldable synthetic plastics material thereon, the first coating being between the paper substrate and the second coating, the weldable coatings being secured to one another in such manner as to provide a series of closed pockets between the composite sheets, each pocket having a powdered substance contained therein which, in the presence of moisture, generates sulphur dioxide.

2. The sulphur dioxide generator of claim 1, wherein the first coating comprises sodium metabisulphate.

3. The sulphur dioxide generator of claim 1, wherein the first coating comprises an acidic mixture containing sodium sulphite and fumaric acid.

4. The sulphur dioxide generator of claim 1, wherein the first coating comprises an acidic mixture containing sodium sulphite and potassium bitartrate.

5. The sulphur dioxide generator of claim 4, wherein the first coating further comprises an acidic mixture containing fumaric acid.

* * * * *